United States Patent
Sugiki et al.

(10) Patent No.: US 11,757,783 B2
(45) Date of Patent: Sep. 12, 2023

(54) ENUM/DNS PACKET PRIORITY CONTROL SYSTEM AND ENUM/DNS PACKET PRIORITY CONTROL METHOD

(71) Applicant: Nippon Telegraph and Telephone Corporation, Tokyo (JP)

(72) Inventors: Yuta Sugiki, Musashino (JP); Satoshi Shimizu, Musashino (JP); Kodai Yamamoto, Musashino (JP); Kenichi Nakamura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 169 days.

(21) Appl. No.: 17/428,005

(22) PCT Filed: Jan. 23, 2020

(86) PCT No.: PCT/JP2020/002253
§ 371 (c)(1),
(2) Date: Aug. 3, 2021

(87) PCT Pub. No.: WO2020/162198
PCT Pub. Date: Aug. 13, 2020

(65) Prior Publication Data
US 2022/0124042 A1 Apr. 21, 2022

(30) Foreign Application Priority Data
Feb. 4, 2019 (JP) .................. 2019-017580

(51) Int. Cl.
*H04L 47/2441* (2022.01)
*H04L 47/2483* (2022.01)
(Continued)

(52) U.S. Cl.
CPC ...... *H04L 47/2441* (2013.01); *H04L 47/2483* (2013.01); *H04L 47/2491* (2013.01);
(Continued)

(58) Field of Classification Search
CPC ............ H04L 47/2441; H04L 61/4557; H04L 61/4511; H04L 47/2483; H04L 47/2491; H04L 47/12
See application file for complete search history.

(56) References Cited

U.S. PATENT DOCUMENTS

2007/0160056 A1* 7/2007 Matsumoto ............. H04W 8/04
370/395.2
2007/0265990 A1* 11/2007 Sidhu ................. G06Q 30/0284
705/418

FOREIGN PATENT DOCUMENTS

| JP | 2006339938 | 12/2006 |
| JP | 2017175248 | 9/2017 |
| JP | 2018170542 | 11/2018 |

OTHER PUBLICATIONS

Kidera et al., "An enhancement of congestion control at originating communication switching system," IEICE Technical Report, 1995, 94(451):7-12, 15 pages (With English Translation).

* cited by examiner

Primary Examiner — Duc C Ho
(74) Attorney, Agent, or Firm — Fish & Richardson P.C.

(57) ABSTRACT

When congestion occurs, the ENUM/DNS server can identify a priority packet without relaying on origin terminal information. An ENUM/DNS packet priority control system 100 includes a call control server 10 that, upon receiving a connection request from a terminal, determines whether or not the connection request is to be subjected to priority processing based on predetermined determination logic, and generates an ENUM/DNS packet that has a priority flag upon determining that the connection request is to be subjected to priority processing. The ENUM/DNS packet priority control system 100 also includes an ENUM/DNS server 20 that, upon receiving an ENUM/DNS packet that (Continued)

has the priority flag, determines that the packet is to be subjected to priority processing, and transmits, to the call control server 10, connection destination information that corresponds to the call destination terminal.

4 Claims, 7 Drawing Sheets

(51) Int. Cl.
*H04L 47/2491* (2022.01)
*H04L 61/4511* (2022.01)
*H04L 61/4557* (2022.01)
*H04L 47/12* (2022.01)

(52) U.S. Cl.
CPC ...... *H04L 61/4511* (2022.05); *H04L 61/4557* (2022.05); *H04L 47/12* (2013.01)

PRIOR ART

230 CONNECTION DESTINATION INFORMATION TABLE

| CALL DESTINATION INFORMATION | CONNECTION DESTINATION INFORMATION |
|---|---|
| 5.5.5.5.4.3.2.1.3.1.8.e164enum.net | sip:+81312345555@carrier_a.ne.jp |
| 6.6.6.6.4.3.2.1.3.1.8.e164enum.net | sip:+81312346666@carrier_a.ne.jp |
| 7.7.7.7.4.3.2.1.3.1.8.e164enum.net | sip:+81312347777@carrier_a.ne.jp |
| 8.8.8.8.4.3.2.1.3.1.8.e164enum.net | sip:+81312348888@carrier_b.ne.jp |
| 9.9.9.9.4.3.2.1.3.1.8.e164enum.net | sip:+81312349999@carrier_c.ne.jp |
| ... | ... |

PRIOR ART

ENUM/DNS PACKET PRIORITY CONTROL SYSTEM AND ENUM/DNS PACKET PRIORITY CONTROL METHOD

CROSS-REFERENCE TO RELATED APPLICATIONS

This application is a National Stage application under 35 U.S.C. § 371 of International Application No. PCT/JP2020/002253, having an International Filing Date of Jan. 23, 2020, which claims priority to Japanese Application Serial No. 2019-017580, filed on Feb. 4, 2019. The disclosure of the prior application is considered part of the disclosure of this application, and is incorporated in its entirety into this application.

TECHNICAL FIELD

The present invention relates to an ENUM (E.164 Number Mapping)/DNS (Domain Name System) packet priority control system and an ENUM/DNS packet priority control method for controlling the priority of certain ENUM/DNS packets.

BACKGROUND ART

Conventionally, the ENUM/DNS system has been proposed as a system in which, in an IP network, telephone numbers are associated with URIs (Uniform Resource Identifiers) by an apparatus (e.g., a call control server) in a communication provider network. In this ENUM/DNS system, a call control server provided in the communication provider network queries an ENUM/DNS server for connection destination information (e.g., an IP address or a domain name) for the telephone number of a connection destination terminal (e.g., an IP telephone), and performs routing based on the connection destination information.

The ENUM/DNS server accepts access from multiple call control servers and the like provided in the communication provider network, and, because each call control server stores information on a large number of terminals (e.g., IP telephones), the ENUM/DNS server accepts access from an enormous number of terminals overall. Note that in the ENUM/DNS system, the call control servers generate ENUM/DNS queries that are compliant with the ENUM protocol in order to make a query for connection destination information (e.g., an IP address or a domain name).

If a disaster occurs and a large number of calls are made to the disaster region, congestion occurs in the ENUM/DNS queries made in that case in particular. The ENUM/DNS server may require more time to respond to queries from call control servers, or in the worst case may fail to respond, thus leading to more connection delays or connection failures between terminals.

Even during an emergency when a disaster or the like occurs, each communication provider needs to prioritize the processing of ENUM/DNS queries (packets) from the terminals of high-priority users at police stations, fire stations, hospitals, and the like, as well as the terminals of users who have a high priority according to their contract. To achieve this, in the invention disclosed in PTL 1, as a technique for giving priority to ENUM/DNS packets, a call control server between a client (terminal) and an ENUM/ENS server changes the top level domain of a query according to whether the origin terminal has a high or normal priority, and the ENUM/DNS server accordingly identifies whether or not a packet is a priority packet.

Figure 7:
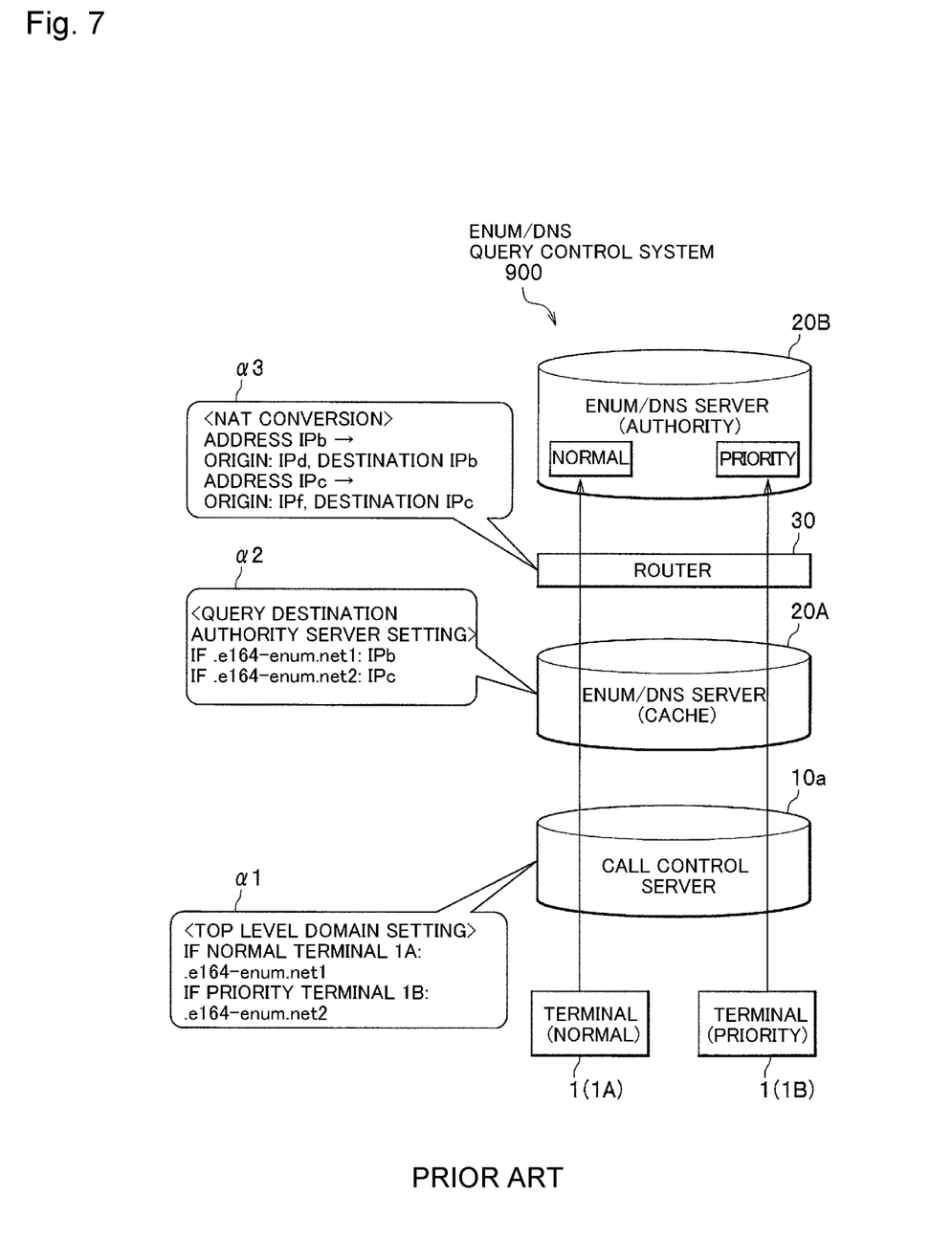
FIG. 7 is a diagram illustrating an ENUM/DNS query control system that executes a conventional technique for prioritizing ENUM/DNS packets.

FIG. 7 is a diagram illustrating an ENUM/DNS query control system 900 that executes a conventional technique for prioritizing ENUM/DNS packets.

As shown in FIG. 7, the ENUM/DNS query control system 900 includes a call control server 10a that stores information on multiple terminals 1, a cache ENUM/DNS server 20A that is connected to the call control server 10a, a router 30 that is connected to the cache ENUM/DNS server 20A, and an authority ENUM/DNS server 20B that is connected to the router 30.

In the query control system 900, the call control server 10a changes the top level domain in ENUM/DNS packets according to the priorities of the terminals 1. For example, if a connection request is received from a normal terminal 1 (1A), the call control server 10a changes the top level domain to ".e164-enum.net1". If a connection destination request is received from a priority terminal 1 (1B), the call control server 10a changes the top level domain to ".e164-enum.net2" (see reference sign α1).

The cache ENUM/DNS server 20A also sets a different destination IP address (the destination IP address of the authority ENUM/DNS server 20B) according to the top level domain included in the ENUM/DNS packet. For example, the cache ENUM/DNS server 20A sets the destination IP address to "IPb" if the top level domain included in the ENUM/DNS packet is ".e164-enum.net1", and sets the destination IP address to "IPc" and if the top level domain is ".e164-enum.net2" (see reference sign α2).

The router 30 then performs NAT conversion to convert the source IP address of the ENUM/DNS packet to a different source address according to the destination IP address of the ENUM/DNS packet. For example, the router 30 sets the source IP address to "IPd" if the destination IP address is "IPb", and sets the source IP address to "IPf" if the destination IP address is "IPc" (see reference sign α3).

In this way, the source address of an ENUM/DNS packet bound for the authority ENUM/DNS server 20B changes according to the priority of the terminal 1. Accordingly, the authority ENUM/DNS server 20B can determine the priority of the ENUM/DNS packet based on the source IP address thereof.

CITATION LIST

Patent Literature

[PTL 1] JP 2018-170542 A

SUMMARY OF THE INVENTION

Technical Problem

However, "JJ-90.31" ("Common Interconnection Interface For Carrier ENUM", Version 4.0, 29 Aug. 2018, Telecommunication Technology Committee), which defines ENUM standards, specifies that ".e164enum.net" shall be set as the top level domain designated in an ENUM/DNS query. For this reason, if priority packets are to be identified using differences in the top level domain, it is no longer possible to satisfy the technological standard. Also, in the conventional technique for prioritizing ENUM/DNS packets, priority is identified for each origin terminal. The ENUM/DNS protocol defined in the ENUM standard does not provide a flag for determining packet priority such as in the SIP (Session Initiation Protocol). In other words, a mechanism for prioritizing the processing of emergency calls such as calls to 110 or 119 in a congested situation does not exist in the protocol. For this reason, packet priority cannot be determined based on information regarding the destination terminal or the like.

The present invention was achieved in light of the foregoing situation, and an object of the present invention is to provide an ENUM/DNS packet priority control system and an ENUM/DNS packet priority control method in which an ENUM/DNS server can identify a priority packet without relying on origin terminal information when congestion occurs.

Means for Solving the Problem

In order to solve the foregoing problems, the invention recited in claim 1 is an ENUM/DNS packet priority control system including a call control server configured to receive a connection request from a terminal and transmit, to an ENUM/DNS server, an ENUM/DNS packet that requests connection destination information corresponding to a call destination terminal indicated in the connection request, and also including the ENUM/DNS server configured to receive the ENUM/DNS packet and transmit the connection destination information to the call control server, wherein the call control server includes: a priority connection determination unit configured to receive the connection request from the terminal and determine whether or not the connection request is to be subjected to priority processing based on predetermined determination logic; and a connection destination information request unit configured to, in a case where the priority connection determination unit determined that the connection request is to be subjected to priority processing, generate an ENUM/DNS packet that has a priority flag and transmit the generated ENUM/DNS packet to the ENUM/DNS server, and in a case where the priority connection determination unit determined that the connection request is not to be subjected to priority processing, generate an ENUM/DNS packet that does not have the priority flag and transmit the generated ENUM/DNS packet to the ENUM/DNS server, and the ENUM/DNS server includes: a priority packet determination unit configured to determine whether or not the received ENUM/DNS packet has the priority flag; a limit processing unit configured to execute predetermined limit processing on the received ENUM/DNS packet if it was determined that the ENUM/DNS packet does not have the priority flag; and a connection destination information reply unit configured to transmit connection destination information that corresponds to the call destination terminal to the call control server if it was determined that the received ENUM/DNS packet has the priority flag.

Also, the invention recited in claim 3 is an ENUM/DNS packet priority control method performed in an ENUM/DNS packet priority control system that includes a call control server configured to receive a connection request from a terminal and transmit, to an ENUM/DNS server, an ENUM/DNS packet that requests connection destination information corresponding to a call destination terminal indicated in the connection request, and also includes the ENUM/DNS server configured to receive the ENUM/DNS packet and transmit the connection destination information to the call control server, wherein the call control server performs: a step of receiving the connection request from the terminal and determining whether or not the connection request is to be subjected to priority processing based on predetermined determination logic; and a step of, in a case where it was determined that the connection request is to be subjected to priority processing, generating an ENUM/DNS packet that has a priority flag and transmitting the generated ENUM/DNS packet to the ENUM/DNS server, and in a case where it was determined that the connection request is not to be subjected to priority processing, generating an ENUM/DNS packet that does not have the priority flag and transmitting the generated ENUM/DNS packet to the ENUM/DNS server, and the ENUM/DNS server performs: a step of determining whether or not the received ENUM/DNS packet has the priority flag; a step of executing predetermined limit processing on the received ENUM/DNS packet if it was determined that the ENUM/DNS packet does not have the priority flag; and a step of transmitting connection destination information that corresponds to the call destination terminal to the call control server if it was determined that the received ENUM/DNS packet has the priority flag.

According to this configuration, in the ENUM/DNS packet priority system, the call control server can determine whether or not a received connection request is to be subjected to priority processing based on predetermined logic, and if the connection request is to be prioritized, can generate an ENUM/DNS packet that has a priority flag and transmit the ENUM/DNS packet to the ENUM/DNS server. Accordingly, the ENUM/DNS server can determine whether or not an ENUM/DNS packet is to be subjected to priority processing based on a priority flag that is set based on information included in the connection request (e.g., call destination information, or a priority flag that compliant with the SIP protocol). In other words, the ENUM/DNS server can determine whether or not a packet is a priority packet without relying on origin terminal information as in conventional technology.

The invention recited in claim 2 is the ENUM/DNS packet priority control system according to claim 1, wherein the call control server further comprises a storage unit that stores priority call destination information that indicates information regarding a call destination for which a connection is to be prioritized, and the predetermined determination logic is logic for determining that the connection request is to be subjected to priority processing if call destination information in the connection request is included in the priority call destination information, and determining that the connection request is not to be subjected to priority processing if the call destination information in the connection request is not included in the priority call destination information.

Accordingly, information regarding call destinations that are to be prioritized is stored as priority call destination information in advance in the storage unit of the call control server, thus making it possible to determine whether or not a connection request is to be subjected to priority processing based on call destination information included in the connection request. Accordingly, if information regarding specific call destinations such as police stations, fire stations, city government offices, and hospitals is stored as priority call destination information, it is possible to prioritize the processing of connection requests for such call destinations if a large-scale disaster or the like occurs.

Effects of the Invention

According to the present invention, it is possible to provide an ENUM/DNS packet priority control system and an ENUM/DNS packet priority control method in which an ENUM/DNS server can identify a priority packet without relying on origin terminal information when congestion occurs.

DESCRIPTION OF EMBODIMENTS

The following describes an ENUM/DNS packet priority control system 100 and the like in a mode for carrying out of the present invention (hereinafter called the present embodiment).

<<ENUM/DNS Packet Priority Processing System>>

First, the following describes an ENUM/DNS packet priority control system 100 according to the present embodiment.

Figure 1:
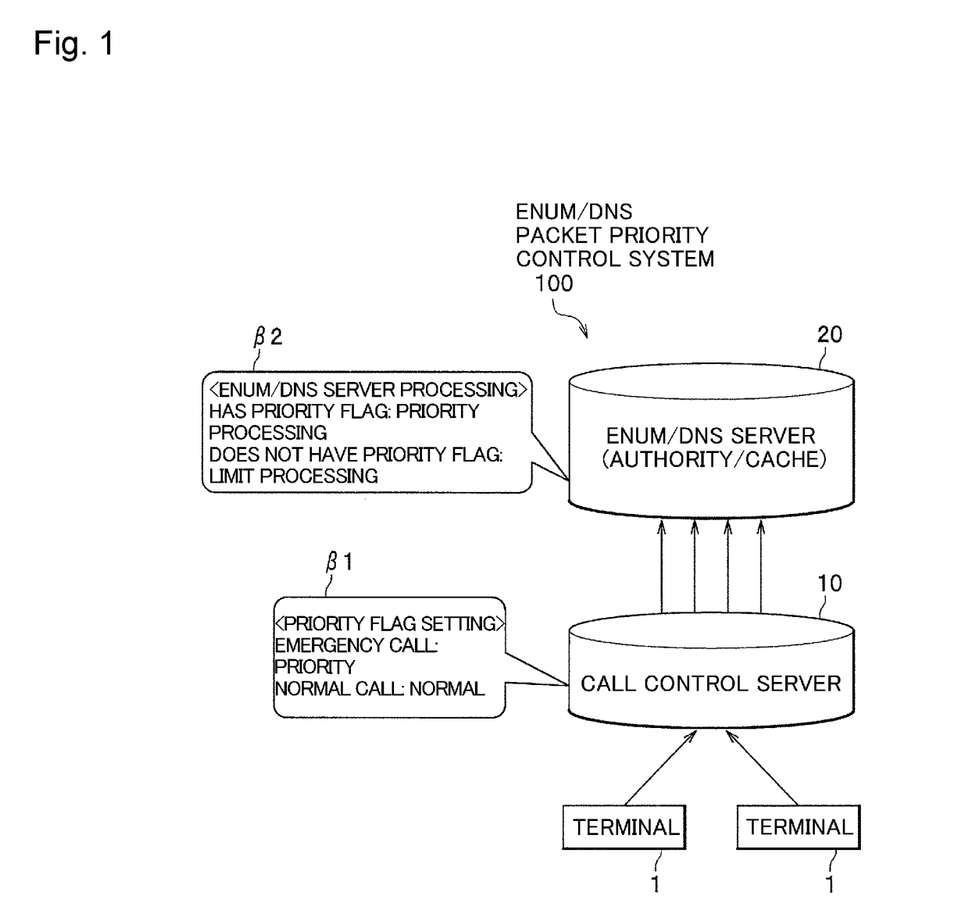
FIG. 1 is a diagram showing an overall configuration of an ENUM/DNS packet priority control system according to an embodiment, and an overview of processing performed therein.

FIG. 1 is a diagram showing an overall configuration of the ENUM/DNS packet priority control system 100 according to the present embodiment, and an overview of processing performed therein.

As shown in FIG. 1, the ENUM/DNS packet priority control system 100 of the present embodiment includes a call control server 10 that stores information on multiple terminals 1, and an ENUM/DNS server (authority/cache) 20 that is connected to the call control server 10.

As shown in FIG. 1, upon receiving an SIP packet, which is a connection request, from a terminal 1, the call control server 10 determines whether or not that SIP packet is an emergency call (priority packet) that requires priority processing or a normal call (normal packet) that does not require priority processing, based on predetermined determination logic (described in detail later) that uses information in the SIP packet (e.g., call destination information). In the case of determining that the SIP packet is an emergency call that requires priority processing, the call control server 10 generates an ENUM/DNS packet that has a priority flag and transmits the ENUM/DNS packet to the ENUM/DNS server 20. On the other hand, in the case of determining that the SIP packet is a normal call that does not require priority processing, the call control server 10 generates an ENUM/DNS packet that does not have a priority flag (i.e., a normal ENUM/DNS packet), and transmits the ENUM/DNS packet to the ENUM/DNS server 20 (see reference sign β1).

Upon receiving the ENUM/DNS packet, the ENUM/DNS server 20 determines whether not the priority flag has been set, and executes congestion priority processing if the priority flag has been set. If the priority flag has not been set, the ENUM/DNS server 20 executes congestion limit processing (e.g., packet discarding) (see reference sign 12).

In the ENUM/DNS packet priority control system 100 of the present embodiment, the call control server 10 can determine whether an SIP packet is a priority packet or a normal packet based on information in the SIP packet (e.g., call destination information) rather than relying on origin terminal information, and can transmit an ENUM/DNS packet that has the priority flag to the ENUM/DNS server 20. Accordingly, if a large-scale disaster or the like occurs, based on the fact that the priority flag has been set for an ENUM/DNS packet that corresponds to a connection request for a specific call destination such as a police station, a fire station, a city government office, or a hospital, the ENUM/DNS server 20 can determine that priority processing is required and perform corresponding processing.

Next, the following describes the specific configuration of the apparatuses (call control server 10 and ENUM/DNS server 20) that constitute the ENUM/DNS packet priority control system 100 of the present embodiment.

<Call Control Server>

Figure 2:
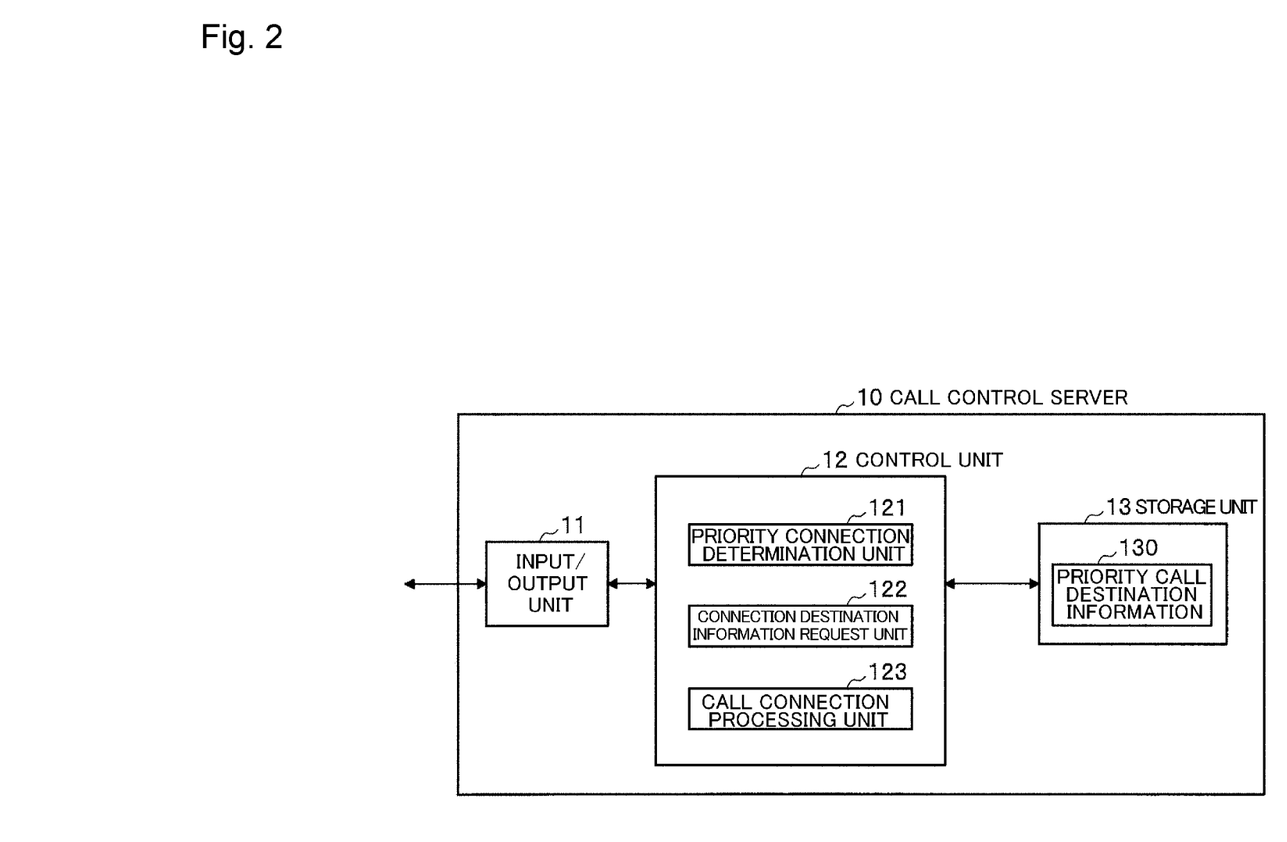
FIG. 2 is a function block diagram showing an example of the configuration of a call control server according to the embodiment.

FIG. 2 is a function block diagram showing an example of the configuration of the call control server 10 according to the present embodiment.

The call control server 10 is an SIP server that stores information on multiple terminals 1 (see FIG. 1) and executes call processing based on SIP, for example.

Upon receiving a connection request (SIP packet) from a terminal 1, the call control server 10 determines whether the connection request packet is a packet that is to be prioritized (priority packet) or a packet that is normal (normal packet) based on information in the connection request (SIP packet). The call control server 10 then generates an ENUM/DNS query (packet) that requests the ENUM/DNS server 20 for connection destination information (e.g., a URI) that corresponds to the call destination information (e.g., the telephone number of the terminal 1 that is the call destination), sets the priority flag in the ENUM/DNS query (packet) if the SIP packet was determined to be a priority packet, and transmits the ENUM/DNS query (packet) to the ENUM/DNS server 20. The call control server 10 then makes a call connection with the call destination terminal 1 based on the connection destination information received from the ENUM/DNS server 20.

The call control server 10 includes an input/output unit 11, a control unit 12, and a storage unit 13.

The input/output unit 11 inputs and outputs information from and to other apparatuses and the like. For example, the input/output unit 11 transmits and receives information to and from the terminals 1, the ENUM/DNS server 20, and the like. The input/output unit 11 is constituted by a communication interface for transmitting and receiving information via a communication line, and an input/output interface for inputting and outputting information from and to an input apparatus such as a keyboard (not shown) and an output apparatus such as a monitor.

The storage unit 13 is constituted by a hard disk, a flash memory, a RAM (Random Access Memory), or the like.

The storage unit 13 stores later-described priority call destination information 130, and also temporarily stores programs for executing the functions of the control unit 12 and information necessary for processing performed by the control unit 12.

The control unit 12 performs overall control of the processing executed by the call control server 10, and includes a priority connection determination unit 121, a connection destination information request unit 122, and a call connection processing unit 123. Note that the control unit 12 is realized by a program stored in the storage unit 13 of the call control server 10 being deployed to a RAM and executed by a CPU (Central Processing Unit), for example.

Upon receiving a connection request from a terminal 1, the priority connection determination unit 121 determines whether the connection request (SIP packet) is a priority packet or a normal packet based on predetermined determination logic that uses information in the connection request (SIP packet).

For example, the priority connection determination unit 121 can determine whether or not the connection request is a priority packet based on the following determination logic.

The priority connection determination unit 121 extracts the call destination information included in the received connection request (SIP packet), and determines whether or not the extracted call destination information is registered in priority call destination information 130 stored in the storage unit 13. For example, the call destination numbers of 110 services, 119 services, city government offices, hospitals, and the like are registered in advance in the priority call destination information 130 as call destinations for which a call connection is to be prioritized. The priority connection determination unit 121 determines that the connection request (SIP packet) is a priority packet if the call destination (number) information included in the packet is registered in the priority call destination information 130, and determines that the connection request (SIP packet) is a normal packet if the call destination (number) information is not registered in the priority call destination information 130.

Note that the predetermined determination logic performed by the priority connection determination unit 121 to identify a priority packet is not limited to the determination logic described above, and may be other determination logic. For example, the priority connection determination unit 121 may determine whether or not a priority flag compliant with the SIP protocol has been given to a connection request (SIP packet) received by the call control server 10, and determine that the connection request is a priority packet if the packet has the priority flag compliant with the SIP protocol.

If the priority connection determination unit 121 determined that the connection request is a priority packet, the connection destination information request unit 122 generates an ENUM/DNS query (packet) that has the priority flag and transmits the ENUM/DNS query (packet) to the ENUM/DNS server 20. If the priority connection determination unit 121 determined that the connection request is a normal packet, the connection destination information request unit 122 generates an ENUM/DNS query (packet) that does not have the priority flag and transmits the ENUM/DNS query (packet) to the ENUM/DNS server 20.

For example, if the call destination number included in the connection request received from the terminal 1 is 03-1234-5555, the connection destination information request unit 122 reverses the order of the E.164 number (+81-3-1234-5555) for that call destination number, separates the digits with periods, and adds "e164enum.net" to obtain the call destination information (5.5.5.5.4.3.2.1.3.1.8.e164enum.net), and generates the ENUM/DNS query (packet).

The connection destination information request unit 122 then sets a priority flag in a predetermined field in the header section of the ENUM/DNS query (packet).

Figure 3:
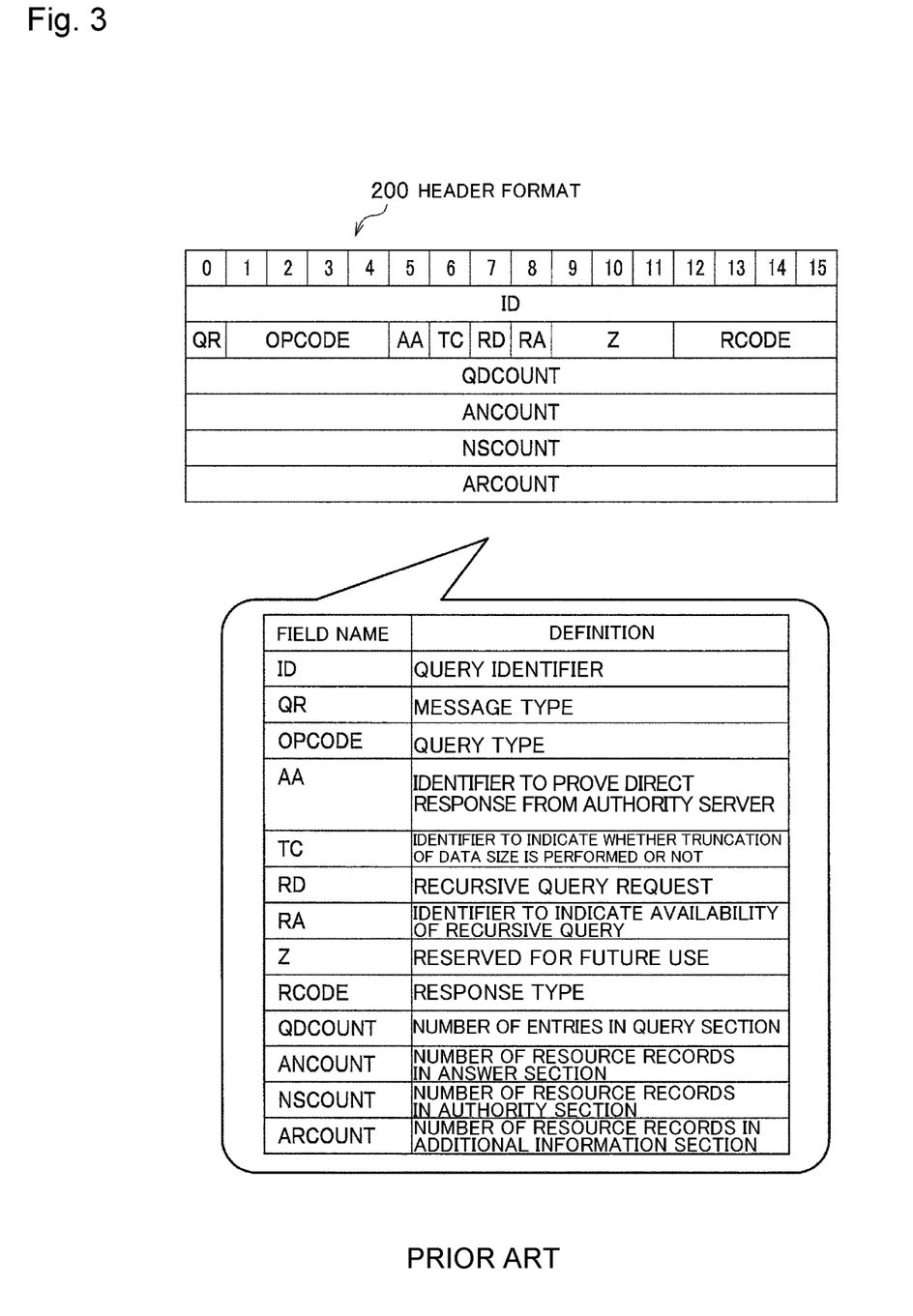
FIG. 3 is a diagram showing a format of the header section of an ENUM/DNS packet.

FIG. 3 is a diagram showing a format 200 of the header section of an ENUM/DNS packet. The format 200 of the header section of an ENUM/DNS packet is defined by the aforementioned ENUM standards, and as shown in FIG. 3, includes the following fields: ID (query identifier), QR (message type), OPCODE (query type), AA (identifier to prove direct response from authority server), TC (identifier to indicate whether truncation of data size is performed or not), RD (recursive query request), RA (identifier to indicate availability of recursive query), Z (reserved for future use), RCODE (response type), QDCOUNT (number of entries in query section), ANCOUNT (number of resource records in answer section), NSCOUNT (number of resource records in authority section), and ARCOUNT (number of resource records in additional information section).

For example, the connection destination information request unit 122 sets priority flag information in the "Z" field of the format 200 of the header section when generating the ENUM/DNS query (packet). Note that the priority flag is not limited to being set in the "Z" field, and may be determined in advance to be set in any location.

Returning to FIG. 2, upon receiving an ENUM/DNS response for the ENUM/DNS query (packet) from the ENUM/DNS server 20, the call connection processing unit 123 extracts connection destination information attached to the ENUM/DNS response. The call connection processing unit 123 then determines whether or not the extracted connection destination information indicates its own IP network. In the case of determining that the connection destination information indicates its own IP network, the call connection processing unit 123 transmits the connection request to the terminal 1 indicated in the call destination information, and makes a call connection.

On the other hand, in the case of determining that the extracted connection destination information indicates a different IP network (e.g., the IP network of a different communication provider), the call connection processing unit 123 transmits the connection request to the other IP network.

As described above, the call control server 10 can determine whether or not the received connection request is a packet that requires priority based on information in the SIP packet (e.g., call destination information), and, upon determining that the connection request is a priority packet, the call control server 10 can generate an ENUM/DNS query (packet) that has a priority flag and transmit the ENUM/DNS query (packet) to the ENUM/DNS server 20.

<ENUM/DNS Server>

Figure 4:
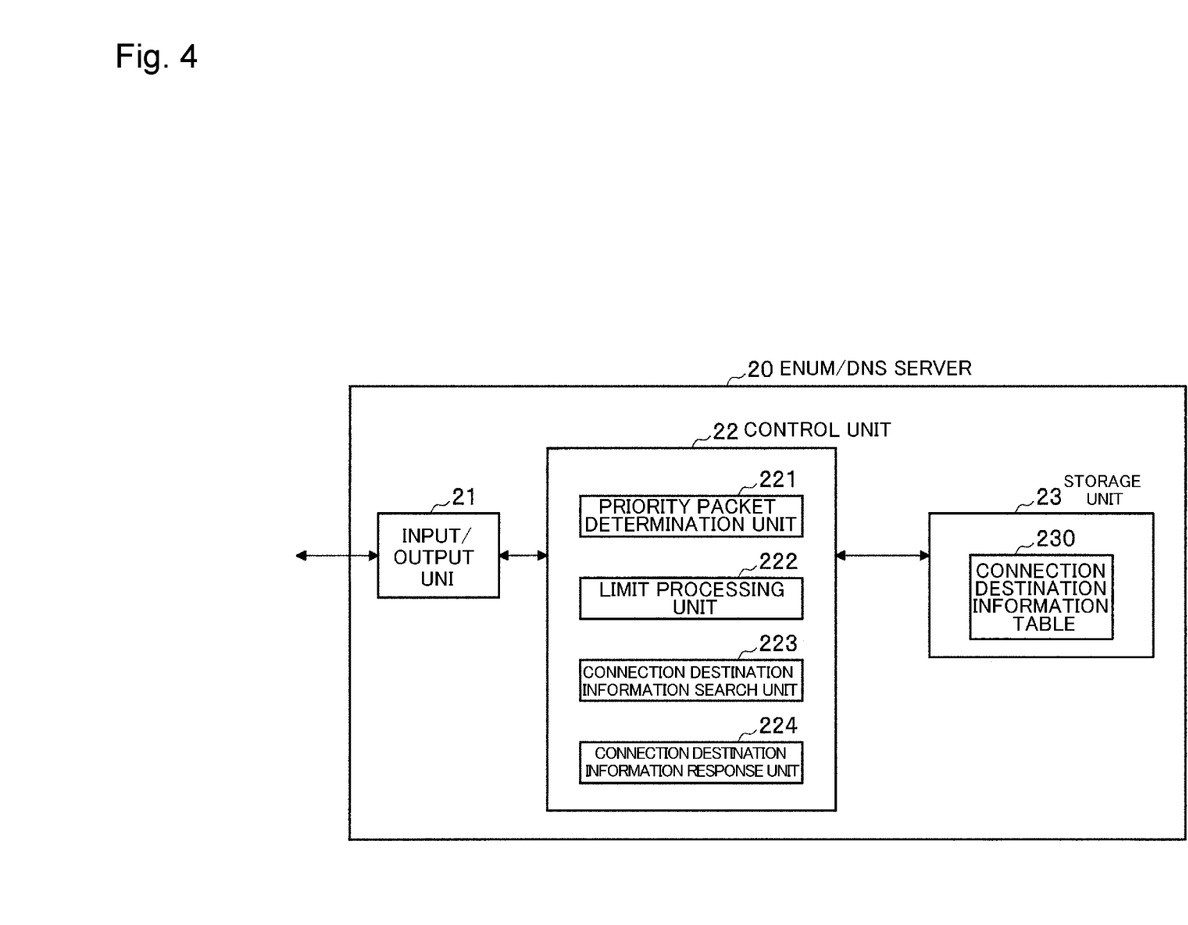
FIG. 4 is a function block diagram showing an example of the configuration of an ENUM/DNS server according to the embodiment.

Next, the following describes the ENUM/DNS server 20 of the present embodiment. FIG. 4 is a function block diagram showing an example of the configuration of the ENUM/DNS server 20 according to the present embodiment.

The ENUM/DNS server 20 includes a connection destination information table 230, and transmits, to the call control server 10, connection destination information that corresponds to call destination information in response to an ENUM/DNS query (packet) from the call control server 10.

Upon receiving the ENUM/DNS query (packet), the ENUM/DNS server 20 determines whether or not the priority flag has been set, that is to say whether or not the packet is a priority packet. In the case of determining that the received packet is a priority packet, the ENUM/DNS server 20 generates an ENUM/DNS response that has connection destination information without performing limit control, and transmits the ENUM/DNS response to the call control server 10. In other words, priority control is executed. On the other hand, in the case of determining that the received packet is a normal packet rather than a priority packet, the ENUM/DNS server 20 executes congestion limit control.

The ENUM/DNS server 20 includes an input/output unit 21, a control unit 22, and a storage unit 23.

The input/output unit 21 inputs and outputs information from and to other apparatuses and the like. For example, the input/output unit 21 transmits and receives information to and from the call control server 10. The input/output unit 21 is constituted by a communication interface for transmitting and receiving information via a communication line, and an input/output interface for inputting and outputting information from and to an input apparatus such as a keyboard (not shown) and an output apparatus such as a monitor.

The storage unit 23 is constituted by a hard disk, a flash memory, a RAM, or the like.

The storage unit 23 stores a later-described connection destination information table 230 (see FIG. 5), and also temporarily stores programs for executing the functions of the control unit 22 and information necessary for processing performed by the control unit 22.

Note that the storage unit 23 may store information related to packet limiting, such as RRL setting information for use when executing limiting through RRL (Response Rate Limiting). The RRL setting information indicates a monitored domain, the number of queries allowed (per second), and a limiting ratio. Here, the monitored domain is the domain of an area (region) where congestion may occur or is actually occurring during to a disaster or the like. For example, in the case of an area (region) including the 23 Tokyo wards, "3.1.8.e164enum.net" is set. A certain number of queries (per second) (e.g., 50 queries/second) is set as the number of queries allowed (per second). The limit ratio is set to "1/2", for example.

The control unit 22 performs overall control of the processing executed by the ENUM/DNS server 20, and includes a priority packet determination unit 221, a limit processing unit 222, a connection destination information search unit 223, and a connection destination information response unit 224. Note that the control unit 22 is realized by a program stored in the storage unit 23 of the ENUM/DNS server 20 being deployed to a RAM and executed by a CPU (Central Processing Unit), for example. Also, the connection destination information search unit 223 and the connection destination information response unit 224 constitute a connection destination information reply unit recited in the claims.

Upon receiving an ENUM/DNS query (packet) from the call control server 10, the priority packet determination unit 221 determines whether or not the priority flag has been set in the ENUM/DNS query (packet). If the priority flag has been set, the priority packet determination unit 221 determines that the ENUM/DNS query (packet) is a priority packet, and outputs the query to the connection destination information search unit 223 for priority processing.

On the other hand, if the priority flag has not been set, the priority packet determination unit 221 determines that the ENUM/DNS query (packet) is a normal packet, and outputs the query to the limit processing unit 222.

The limit processing unit 222 determines whether or not the call destination information indicates a monitored domain. If the call destination information does not indicate a monitored domain, the limit processing unit 222 outputs the ENUM/DNS query (packet) to the connection destination information search unit 223.

On the other hand, if the call destination information indicates a monitored domain, the limit processing unit 222 determines that the ENUM/DNS query is to be subjected to limiting, and executes predetermined limit processing. For example, if the number of queries allowed (per second) has been exceeded, the limit processing unit 222 performs limiting (discarding) in accordance with the limit ratio (e.g., "1/2"). If the query has not been discarded, the limit processing unit 222 outputs the query to the connection destination information search unit 223.

Note that information such as the number of queries allowed (per second) and the limit ratio is stored in the storage unit 23 in advance, and the limit processing unit 222 executes limiting in the case where monitored domain information regarding a disaster region was received from a network management apparatus (not shown) or the like.

Upon receiving the ENUM/DNS query (packet), the connection destination information search unit 223 extracts the call destination information attached to the query. The connection destination information search unit 223 then references the connection destination information table 230 (FIG. 5) in the storage unit 23 and searches for connection destination information that corresponds to the call destination information. The connection destination information search unit 223 extracts the connection destination information found by searching the connection destination information table 230, and outputs a processing instruction to the connection destination information response unit 224.

Figure 5:
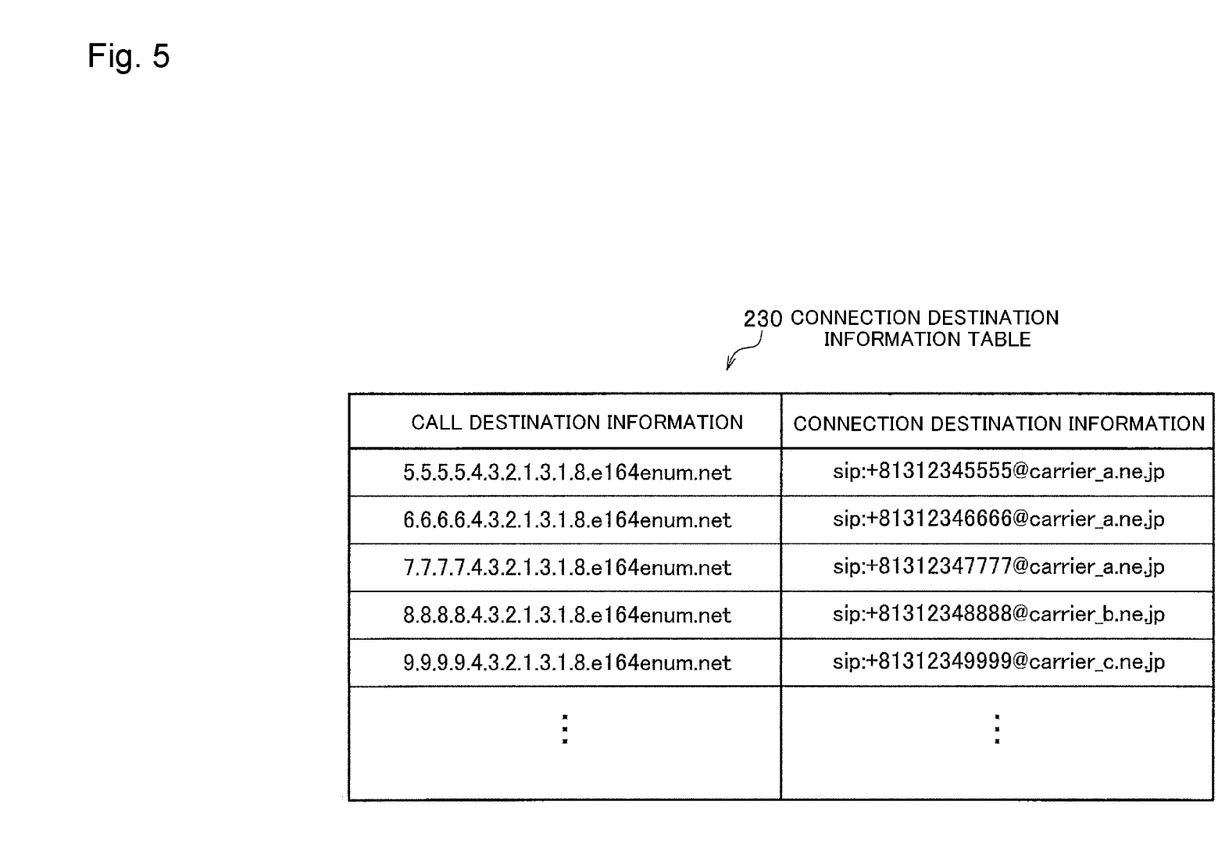
FIG. 5 is a diagram showing an example of the data configuration of a connection destination information table according to the embodiment.

FIG. 5 is a diagram showing an example of the data configuration of the connection destination information table 230 according to the present embodiment.

As shown in the example in FIG. 5, the connection destination information table 230 stores connection destination information in correspondence with call destination information. For example, specifically, the call destination information includes E.164 numbers that have been converted into an ENUM protocol domain format based on the telephone numbers of call destination terminals 1. The connection destination information corresponding to the call destination information includes URIs that include the E.164 numbers of the call destination terminals 1 and the domain names of the connection destination communication providers (carrier_a.ne.jp), for example.

Returning to FIG. 4, the connection destination information response unit 224 generates an ENUM/DNS response to which the connection destination information extracted by the connection destination information search unit 223 is attached. The connection destination information response unit 224 then transmits the generated ENUM/DNS response to the call control server 10.

In this way, the ENUM/DNS server 20 can determine whether or not an ENUM/DNS query (packet) is a priority packet based on whether or not the priority flag has been set in the packet. In the case where congestion is occurring, the ENUM/DNS server 20 can perform limit control if the packet is determined to be a normal packet, and perform priority control rather than limit control if the packet is determined to be a priority packet.

Note that with a configuration in which the ENUM/DNS server is divided into a cache ENUM/DNS server and an authority ENUM/DNS server as in the conventional technology shown in FIG. 7, the effects of the present invention can be achieved if the priority packet determination unit 221 and the limit processing unit 222 of the ENUM/DNS server 20 of the present embodiment are provided in either the cache ENUM/DNS server or the authority ENUM/DNS server.

<<Processing of ENUM/DNS Packet Priority Control System>>

Next, the following describes processing of the ENUM/DNS packet priority control system 100 according to the present embodiment.

It is assumed here that the call destination numbers of 110 services, 119 services, city government offices, hospitals, and the like have been registered in advance in the storage unit 13 of the call control server 10 as the priority call destination information 130 regarding call destinations for which a call connection is to be prioritized. It is also assumed that information necessary for packet limit control, such as a monitored domain, the number of queries allowed (per second), and a limit ratio, has been set in advance in the ENUM/DNS server 20.

Figure 6:
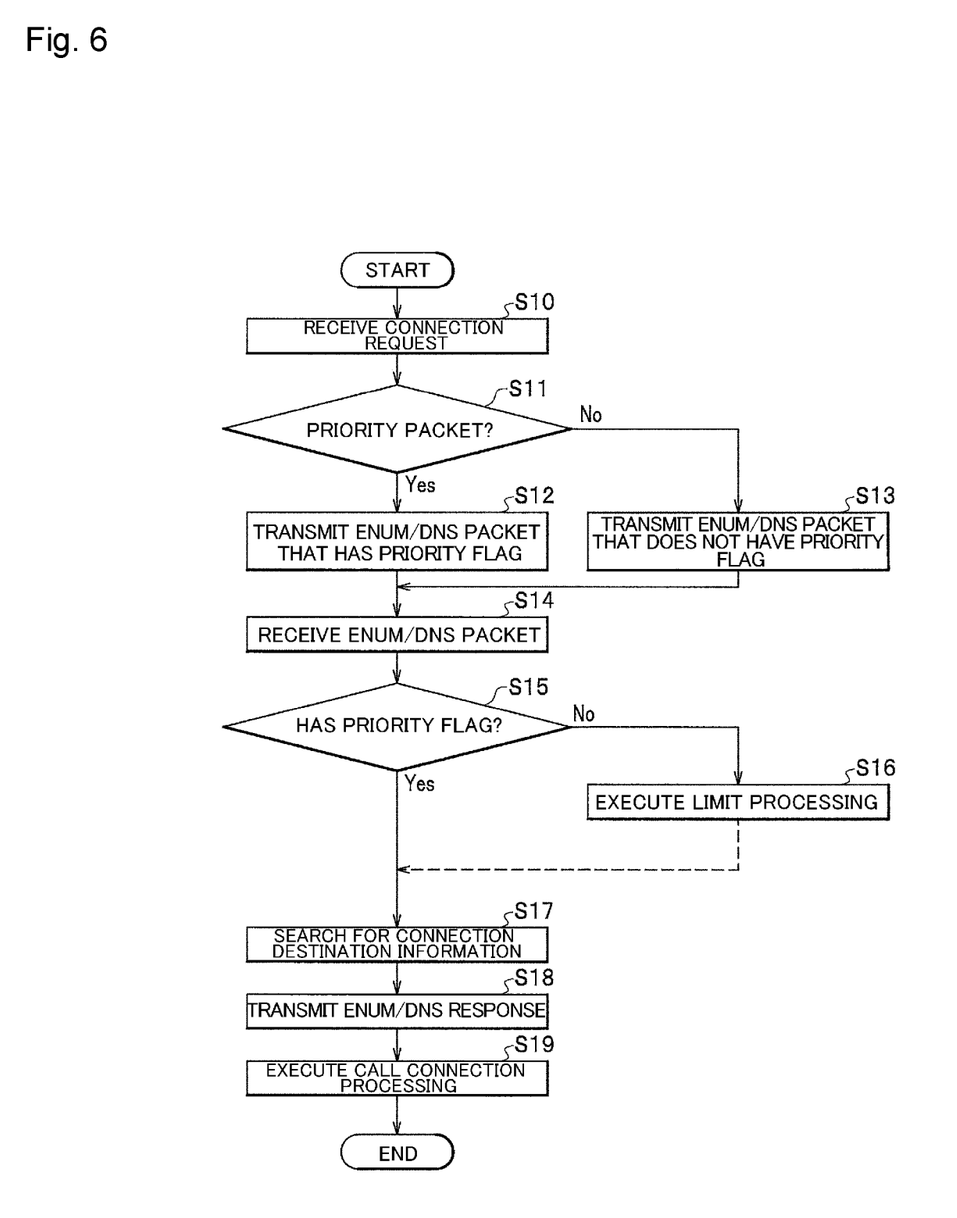
FIG. 6 is a flowchart showing a flow of processing performed in the ENUM/DNS packet priority control system according to the embodiment.

FIG. 6 is a flowchart showing the flow of processing performed in the ENUM/DNS packet priority control system 100 according to the present embodiment.

First, the call control server 10 receives a connection request from a terminal 1 (step S10). The priority connection determination unit 121 of the call control server 10 then determines whether or not the connection request is a priority packet based on predetermined determination logic performed using information in the connection request (SIP packet) (step S11).

The priority connection determination unit 121 determines that the connection request (SIP packet) is a priority packet if the call destination (number) information included in the packet is registered in the priority call destination information 130 (see FIG. 2), and determines that the connection request (SIP packet) is a normal packet if the call destination (number) information is not registered in the priority call destination information 130. Alternatively, the priority connection determination unit 121 may determine whether or not a priority flag compliant with the SIP protocol has been given to a received connection request (SIP packet), and determine that the connection request is a priority packet if the packet has the priority flag compliant with the SIP protocol.

If the priority connection determination unit 121 determined in step S11 that the received connection request is a priority packet (step S11: Yes), the connection destination information request unit 122 of the call control server 10 generates an ENUM/DNS query (packet) that has a priority flag and transmits the ENUM/DNS query (packet) to the ENUM/DNS server 20 (step S12).

On the other hand, if the priority connection determination unit 121 determined that the received connection request is not a priority packet, that is to say is a normal packet (step S11: No), the connection destination information request unit 122 generates an ENUM/DNS query (packet) that does not have a priority flag, and transmits the ENUM/DNS query (packet) to the ENUM/DNS server 20 (step S13).

Next, the priority packet determination unit 221 of the ENUM/DNS server 20 receives the ENUM/DNS query (packet) from the call control server 10 (step S14), and then determines whether or not the priority flag has been set in the ENUM/DNS query (packet) (step S15).

If the priority packet determination unit 221 determined that the priority flag has not been set (step S15: No), the ENUM/DNS query (packet) is a normal packet and is output to the limit processing unit 222, and then processing moves to step S16.

In step S16, if the call destination information in the ENUM/DNS query (packet) indicates a monitored domain, the limit processing unit 222 executes predetermined limit processing.

For example, if the number of queries allowed (per second) has been exceeded, the limit processing unit 222 performs limiting (discarding) in accordance with the limit 2'7 ratio (e.g., "1/2"). If the query has not been discarded, the limit processing unit 222 outputs the query to the connection destination information search unit 223, and then processing moves to step S17.

On the other hand, if the priority packet determination unit 221 determined in step S15 that the priority flag has been set (step S15: Yes), the ENUM/DNS query (packet) is a priority packet and is output to the connection destination information search unit 223 for priority processing, and then processing moves to step S17.

In step S17, upon acquiring the ENUM/DNS query (packet), the connection destination information search unit 223 of the ENUM/DNS server 20 extracts the call destination information attached to the query. The connection destination information search unit 223 then references the connection destination information table 230 (FIG. 5) in the storage unit 23 and searches for connection destination information that corresponds to the call destination information. The connection destination information search unit 223 extracts the connection destination information found by searching the connection destination information table 230, and outputs a processing instruction to the connection destination information response unit 224.

The connection destination information response unit 224 then generates an ENUM/DNS response that includes the connection destination information extracted by the connection destination information search unit 223. The connection destination information response unit 224 then transmits the generated ENUM/DNS response to the call control server 10 (step S18).

Upon receiving the ENUM/DNS response from the ENUM/DNS server 20, the call connection processing unit 123 of the call control server 10 extracts the connection destination information attached to the ENUM/DNS response, and executes processing for call connection (step S19). Specifically, if the extracted connection destination information indicates the IP network of the call connection processing unit 123, the call connection processing unit 123 transmits a connection request for a call connection to the terminal 1 indicated by the call destination information. On the other hand, if the extracted connection destination information indicates a different IP network (e.g., the IP network of a different communication provider), the call connection processing unit 123 transmits the connection request to the other IP network, and then this processing is ended.

As described above, according to the ENUM/DNS packet priority control system 100 and the ENUM/DNS packet priority control method of the present embodiment, in a congested state, the ENUM/DNS server 20 can identify a priority packet without relying on information regarding the origin terminal and accordingly perform priority processing.

REFERENCE SIGNS LIST

1 Terminal
10 Call control server
11, 21 Input/output unit
12, 22 Control unit
13, 23 Storage unit
100 ENUM/DNS packet priority control system
121 Priority connection determination unit
122 Connection destination information request unit
123 Call connection processing unit
130 Priority call destination information
200 Header format
221 Priority packet determination unit
222 Limit processing unit

223 Connection destination information search unit (connection destination information reply unit)
224 Connection destination information response unit (connection destination information reply unit)
230 Connection destination information table

The invention claimed is:

1. An E.164 Number Mapping (ENUM)/Domain Name System (DNS) packet priority control system including a call control server configured to receive a connection request from a terminal and transmit, to an ENUM/DNS server, an ENUM/DNS packet that requests connection destination information corresponding to a call destination terminal indicated in the connection request, and also including the ENUM/DNS server configured to receive the ENUM/DNS packet and transmit the connection destination information to the call control server, the call control server comprising:
a priority connection determination unit, including one or more processors, configured to receive the connection request from the terminal and determine whether or not the connection request is to be subjected to priority processing based on a predetermined determination logic; and
a connection destination information request unit, including one or more processors, configured to, in a case where the priority connection determination unit determined that the connection request is to be subjected to priority processing, generate an ENUM/DNS packet that has a priority flag and transmit the generated ENUM/DNS packet to the ENUM/DNS server, and in a case where the priority connection determination unit determined that the connection request is not to be subjected to priority processing, generate an ENUM/DNS packet that does not have the priority flag and transmit the generated ENUM/DNS packet to the ENUM/DNS server; and the ENUM/DNS server comprising:
a priority packet determination unit, including one or more processors, configured to determine whether or not the received ENUM/DNS packet has the priority flag;
a limit processing unit, including one or more processors, configured to execute predetermined limit processing on the received ENUM/DNS packet when it was determined that the ENUM/DNS packet does not have the priority flag; and
a connection destination information reply unit, including one or more processors, configured to transmit connection destination information that corresponds to the call destination terminal to the call control server when it was determined that the received ENUM/DNS packet has the priority flag.

2. The E.164 Number Mapping (ENUM)/Domain Name System (DNS) packet priority control system according to claim 1, wherein the call control server further comprises a storage unit that stores priority call destination information that indicates information regarding a call destination for which a connection is to be prioritized, and the predetermined determination logic is logic for determining that the connection request is to be subjected to priority processing when call destination information in the connection request is included in the priority call destination information, and determining that the connection request is not to be subjected to priority processing when the call destination information in the connection request is not included in the priority call destination information.

3. An E.164 Number Mapping (ENUM)/Domain Name System (DNS) packet priority control method performed by a ENUM/DNS packet priority control system that includes a call control server configured to receive a connection request from a terminal and transmit, to an ENUM/DNS server, an ENUM/DNS packet that requests connection destination information corresponding to a call destination terminal indicated in the connection request, and also includes the ENUM/DNS server configured to receive the ENUM/DNS packet and transmit the connection destination information to the call control server, the priority control method comprising:

receiving the connection request from the terminal and determining whether or not the connection request is to be subjected to priority processing based on predetermined determination logic; and
in a case where it was determined that the connection request is to be subjected to priority processing, generating an ENUM/DNS packet that has a priority flag and transmitting the generated ENUM/DNS packet to the ENUM/DNS server, and in a case where it was determined that the connection request is not to be subjected to priority processing, generating an ENUM/DNS packet that does not have the priority flag and transmitting the generated ENUM/DNS packet to the ENUM/DNS server, and
determining, by the ENUM/DNS server, whether or not the received ENUM/DNS packet has the priority flag; executing predetermined limit processing on the received ENUM/DNS packet when it was determined that the ENUM/DNS packet does not have the priority flag; and transmitting connection destination information that corresponds to the call destination terminal to the call control server when it was determined that the received ENUM/DNS packet has the priority flag.

4. The E.164 Number Mapping (ENUM)/Domain Name System (DNS) packet priority control method according to claim 3, wherein, storing, a storage unit of the call control server further comprising, priority call destination information that indicates information regarding a call destination for which a connection is to be prioritized, and the predetermined determination logic is logic for determining that the connection request is to be subjected to priority processing when call destination information in the connection request is included in the priority call destination information, and determining that the connection request is not to be subjected to priority processing when the call destination information in the connection request is not included in the priority call destination information.

* * * * *